US012580250B2

(12) United States Patent
Sheerin

(10) Patent No.: US 12,580,250 B2
(45) Date of Patent: *Mar. 17, 2026

(54) METAL AIR GALVANIC ENGINE

(71) Applicant: AlumaPower Corporation, Sarnia (CA)

(72) Inventor: Geoffrey Sheerin, Sarnia (CA)

(73) Assignee: AlumaPower Corporation, Sarnia (CA)

( * ) Notice: Subject to any disclaimer, the term of this patent is extended or adjusted under 35 U.S.C. 154(b) by 324 days.

This patent is subject to a terminal disclaimer.

(21) Appl. No.: 18/269,519

(22) PCT Filed: Dec. 23, 2021

(86) PCT No.: PCT/IB2021/062277
§ 371 (c)(1),
(2) Date: Jun. 23, 2023

(87) PCT Pub. No.: WO2022/137203
PCT Pub. Date: Jun. 30, 2022

(65) Prior Publication Data
US 2024/0063475 A1     Feb. 22, 2024

Related U.S. Application Data

(60) Provisional application No. 63/130,473, filed on Dec. 24, 2020.

(51) Int. Cl.
*H01M 12/08*        (2006.01)
*H01M 50/107*      (2021.01)
(Continued)

(52) U.S. Cl.
CPC ......... *H01M 12/08* (2013.01); *H01M 50/107*
(2021.01); *H01M 50/1385* (2021.01);
(Continued)

(58) Field of Classification Search
CPC .. H01M 12/08; H01M 50/1385; H01M 50/70;
F01M 50/107; H02K 7/003; H02K
11/0094
See application file for complete search history.

(56) References Cited

U.S. PATENT DOCUMENTS

| | | | | |
|---|---|---|---|---|
| 3,663,298 A | * | 5/1972 | McCoy | H01M 10/28 |
| | | | | 429/69 |
| 4,491,624 A | * | 1/1985 | Sarbacher | H01M 8/225 |
| | | | | 429/69 |

(Continued)

FOREIGN PATENT DOCUMENTS

| | | |
|---|---|---|
| CA | 2368209 | 9/2000 |
| CA | 3078423 | 4/2019 |

(Continued)

OTHER PUBLICATIONS

EPO; Extended European Search Report issued May 28, 2025 for related European Application 21909693.0; 9 pages.

(Continued)

*Primary Examiner* — Forrest M Phillips
(74) *Attorney, Agent, or Firm* — Peter J. Mikesell; Schmeiser, Olsen & Watts, LLP

(57)        ABSTRACT

A metal air battery having multiple anode-cathode disc assemblies that include a first and second cathode disc flanking an anode disc. An actuator moves at least one cathode disc relative to the other cathode disc, and thereby facilitates the size of the anode-cathode gap. The anode disc has a hole that engages a power shaft to rotate the anode disc.

20 Claims, 14 Drawing Sheets

(51) Int. Cl.

| | | |
|---|---|---|
| *H01M 50/138* | (2021.01) | |
| *H01M 50/70* | (2021.01) | |
| *H02K 7/00* | (2006.01) | |
| *H02K 11/00* | (2016.01) | |

(52) U.S. Cl.
CPC ............ *H01M 50/70* (2021.01); *H02K 7/003* (2013.01); *H02K 11/0094* (2013.01)

(56) References Cited

U.S. PATENT DOCUMENTS

| | | | |
|---|---|---|---|
| 6,299,998 | B1 * | 10/2001 | Morris .................. H01M 12/08 429/69 |
| 6,458,480 | B1 | 10/2002 | Morris |
| 6,692,867 | B2 | 2/2004 | Nark et al. |
| 6,921,985 | B2 | 7/2005 | Janssen et al. |
| 7,629,705 | B2 | 12/2009 | Barker et al. |
| 7,638,241 | B2 | 12/2009 | Lee et al. |
| 8,691,446 | B2 | 4/2014 | Sakata et al. |
| 8,941,363 | B2 | 1/2015 | Kruglick |
| 9,077,035 | B2 | 7/2015 | Kita et al. |
| 9,166,251 | B2 | 10/2015 | Katayama et al. |
| 9,224,516 | B2 | 12/2015 | Nelson et al. |
| 9,350,019 | B2 | 5/2016 | Sakata et al. |
| 9,698,398 | B2 | 7/2017 | Kong |
| 10,008,754 | B2 | 6/2018 | Englert |
| RE47,520 | E | 7/2019 | Zhang |
| 10,340,504 | B2 | 7/2019 | Englert |
| 10,930,932 | B2 | 2/2021 | Tan et al. |
| 10,978,758 | B2 * | 4/2021 | Sheerin ................. H01M 12/06 |
| 2020/0388895 | A1 | 12/2020 | Sheerin |

FOREIGN PATENT DOCUMENTS

| | | |
|---|---|---|
| CN | 110743234 | 2/2020 |
| JP | 2015207494 | 5/2018 |
| JP | 2019186080 | 7/2021 |

OTHER PUBLICATIONS

Veleva, L.; Soils and Corrosion (Chapter 32); Corrosion Tests and Standards: Application and Interpretation, 2nd Edition; Nov. 2, 2005; pp. 387-404.

ISA/CA; International Search Report/Written Opinion issued Apr. 14, 2022 in related International Application PCT/ B2021/062277.

* cited by examiner

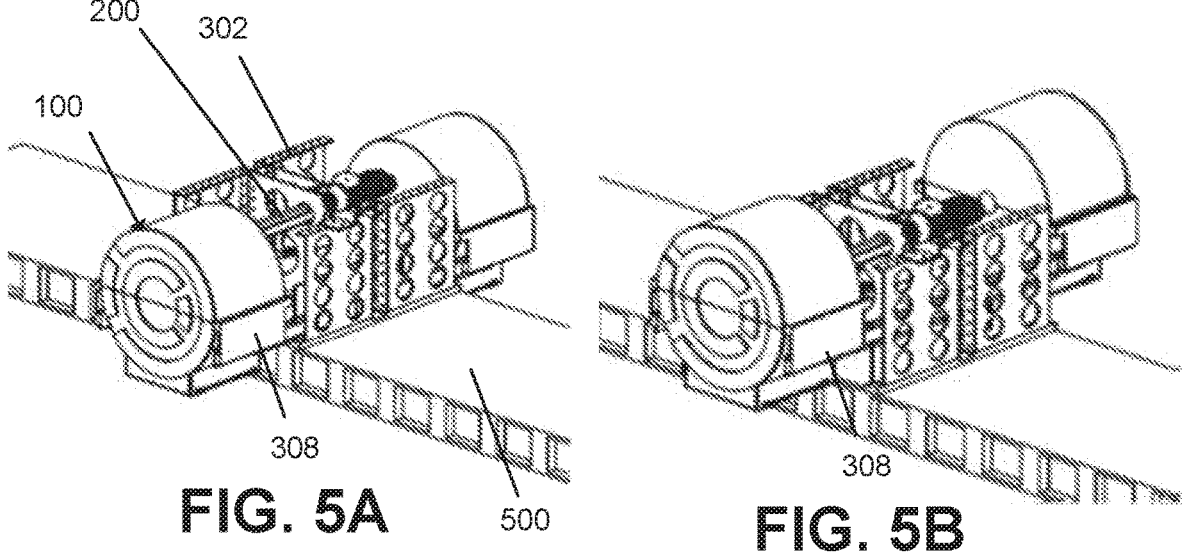
FIG. 5A
FIG. 5B
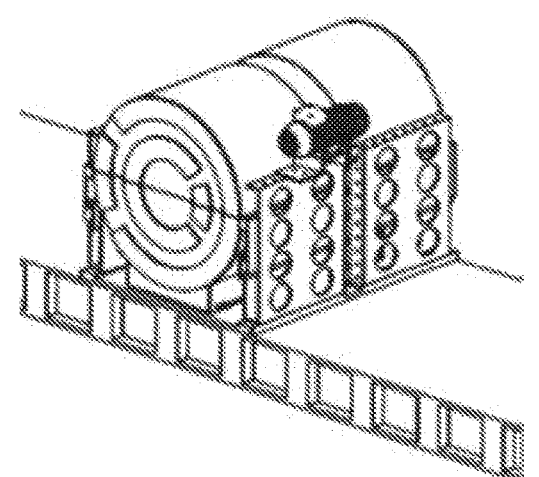
FIG. 5C

100

302

200

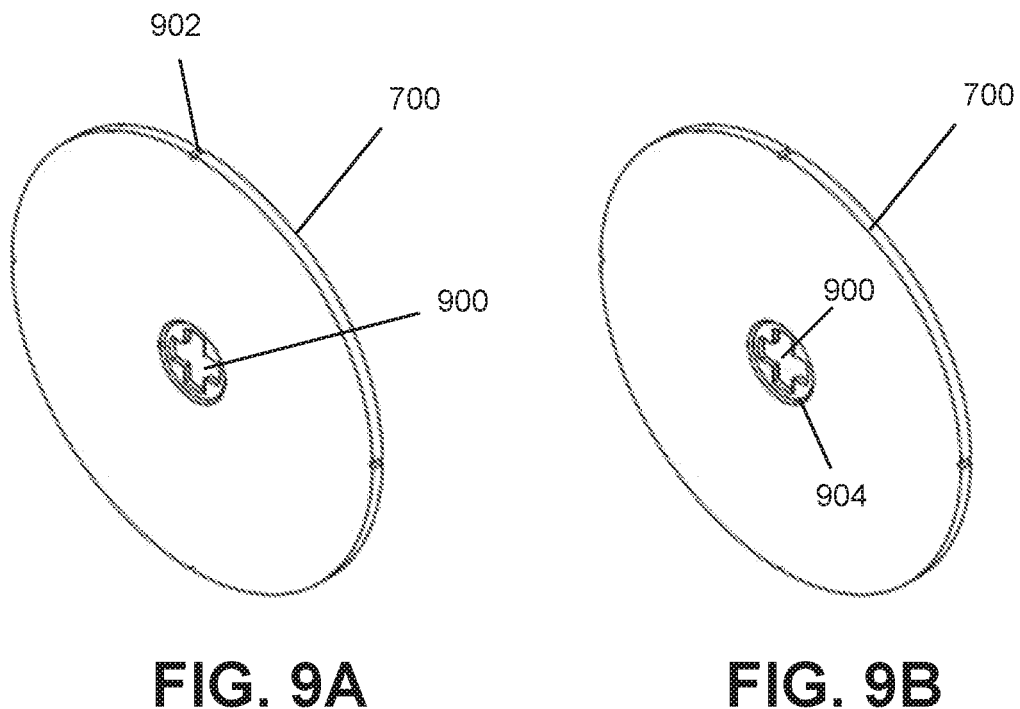
FIG. 9A                    FIG. 9B
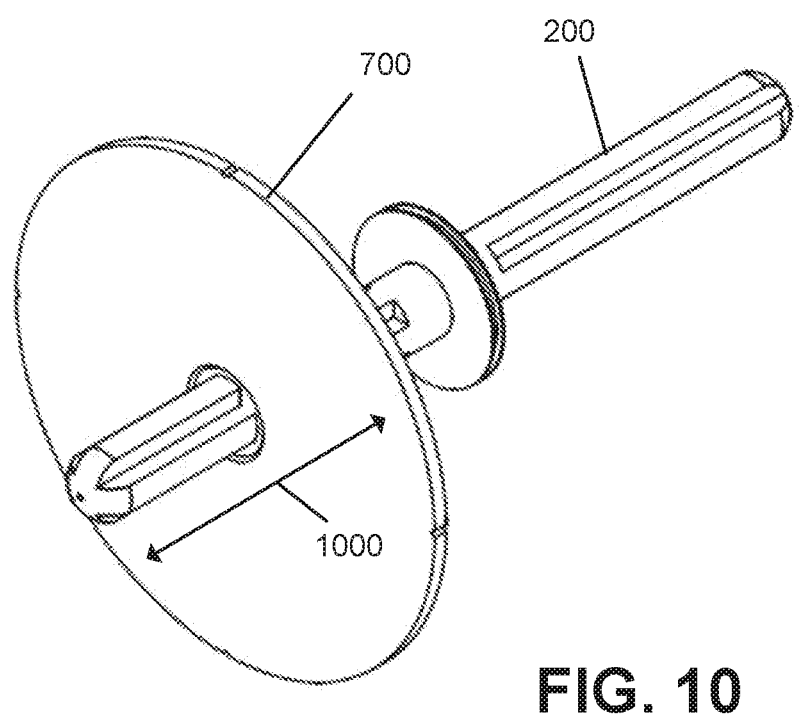
FIG. 10

1300

1302

1304

METAL AIR GALVANIC ENGINE

CROSS-REFERENCE TO RELATED APPLICATIONS

This application is a non-provisional of U.S. Patent Application Ser. No. 63/130,473 (filed Dec. 24, 2020) the entirety of which is incorporated herein by reference.

BACKGROUND OF THE INVENTION

Metal air batteries provide a high energy density power source that shows promising applications for mobile and stationary distributed power sources. They have the potential to replace the internal combustion engines found in hybrid cars, locomotives, ships and aircraft since the energy density and efficiency of conversion approach those of hydrocarbon fuels.

Metal air batteries suffer from a number of problems that have, to date, excluded them from use in the aforementioned areas. Since the metal anode is consumed during the discharge of the battery the distance between the cathode and anode increases over time. This change in electrode spacing increases the $I^2R$ (electrical resistance) lowering the power output over time. Also, when the batteries are run open circuit or without load they rapidly produce hydrogen gas in the electrolyte that further increases $I^2R$ losses and prevents return to full power when connected to a closed electrical circuit again. Once the metal anode is consumed the battery must be dismantled so it can be mechanically recharged with fresh metal anodes before use. This process is required to be performed in a shop making the turnaround time a barrier to frequent recharge and use of metal air batteries.

A number of attempts have been made to resolve the aforementioned problems. There has been much research into the chemistry of electrolyte additives that can inhibit the production of hydrogen gas during operation and when in open circuit without much success. Some removable electrode designs have been tested that incorporate protection of the edges of the anode from corrosion and gas production with limited success. Other designs have attempted to mount the anode on a moving apparatus to reduce the increase in resistance due to increase in space between the electrode and cathode. These have shown to be mechanically complicated and limit the ability to load the battery with fresh metal anodes quickly. None of these solutions have been applied in combination with success leaving the metal air battery as a once use item and difficult to use for intermittent power applications. This has also made the metal air battery difficult to scale into system of thousands of high-power for applications to large machines or power systems.

The discussion above is merely provided for general background information and is not intended to be used as an aid in determining the scope of the claimed subject matter.

SUMMARY

The present disclosure pertains to a high-power metal air battery that provides for quick recharge of cylinder power units using built-in auto load and unloading system. It also provides for complete rapid shutdown of power without parasitic corrosion and production of dangerous hydrogen gas as using centrifugal force on a spinning anode disc and high-pressure jet blast from an air nozzle system. The disclosure also provides for the rapid restart to full power and production of constant power output throughout the consumption of the metal anode. The system also uses a mechanical alternating brush set to provide high current low voltage AC power to a transformer to step up to a lower current higher voltage output.

In a first embodiment, a metal air battery is provided. The metal air battery comprising: a housing comprising an opening with a keyed power shaft disposed in the opening; a plurality of anode-cathode disc assemblies disposed within the housing each anode-cathode disc assembly comprising; a first cathode disc, wherein the keyed power shaft is disposed within a first circular hole of the first cathode disc; a second cathode disc, wherein the keyed power shaft is disposed within a second circular hole of the second cathode disc; an actuator directly connected to both the first cathode disc and the second cathode disc, the actuator configured to change a magnitude of a gap between the first cathode disc and the second cathode disc; a rotating anode disc disposed between the first cathode disc and the second cathode disc, wherein the keyed power shaft is disposed within a keyed hole of the rotating anode disc such that rotation of the keyed power shaft rotates the rotating anode disc, the keyed hole being non-circular; the housing further comprising at least one access port configured to provide a liquid, a gas or an electrical connection to the plurality of anode-cathode disc assemblies.

In a second embodiment, a metal air battery is provided. The metal air battery comprising: a housing comprising an opening with a keyed power shaft disposed in the opening; a plurality of anode-cathode disc assemblies disposed within the housing each anode-cathode disc assembly comprising; a first cathode disc, wherein the keyed power shaft is disposed within a first circular hole of the first cathode disc, wherein the first cathode disc is fixedly connected relative to the housing; a second cathode disc, wherein the keyed power shaft is disposed within a second circular hole of the second cathode disc; an actuator directly connected to both the first cathode disc and the second cathode disc, the actuator configured to change a magnitude of a gap between the first cathode disc and the second cathode disc; a rotating anode disc disposed between the first cathode disc and the second cathode disc, wherein the keyed power shaft is disposed within a keyed hole of the rotating anode disc such that rotation of the keyed power shaft rotates the rotating anode disc, the keyed hole being non-circular; the housing further comprising at least one access port configured to provide a liquid, a gas or an electrical connection to the plurality of anode-cathode disc assemblies.

In a third embodiment, a metal air battery is provided. The metal air battery comprising: a housing comprising an opening with a power shaft disposed in the opening; a plurality of anode-cathode disc assemblies disposed within the housing each anode-cathode disc assembly comprising; a first cathode disc, wherein the power shaft is disposed within a first circular hole of the first cathode disc; a second cathode disc, wherein the power shaft is disposed within a second circular hole of the second cathode disc; an actuator directly connected to both the first cathode disc and the second cathode disc, the actuator configured to change a magnitude of a gap between the first cathode disc and the second cathode disc; a rotating anode disc disposed between the first cathode disc and the second cathode disc, wherein the power shaft is disposed within a hole of the rotating anode disc and engages the rotating anode disc such that rotation of the power shaft rotates the rotating anode disc while not rotating the first cathode disc or the second cathode disc; the housing further comprising at least one access port configured to provide a liquid, a gas or an electrical connection to the plurality of anode-cathode disc assemblies.

This brief description of the invention is intended only to provide a brief overview of subject matter disclosed herein according to one or more illustrative embodiments and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 5A, FIG. 5B and FIG. 5C depict the addition of a fresh metal air battery to the strongback support frame;

FIG. 9A is a perspective view of a rotating anode disc;

FIG. 9B is a front view of a rotating anode disc;

FIG. 10 is a perspective view of the rotating anode disc on the power shaft, wherein the pair of cathode discs has been omitted for simplicity of illustration;

FIG. 13A is a perspective view of a cathode surface;

FIG. 13B is a front view of the cathode surface;

DETAILED DESCRIPTION OF THE INVENTION

Figure 1:
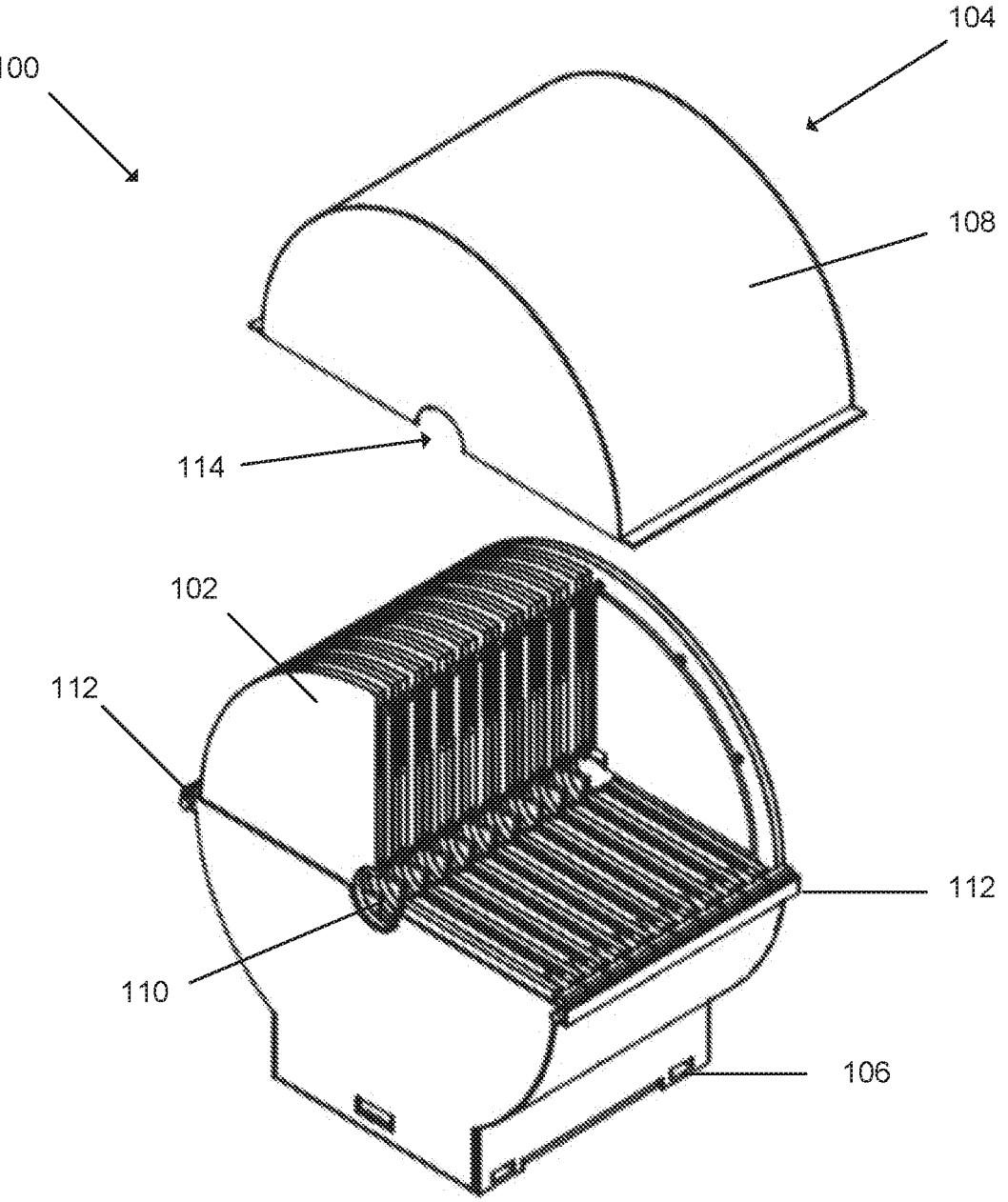
FIG. 1 depicts a metal air battery in a cylindrical housing wherein a quarter portion of the anode-cathode disc assemblies has been removed for illustrative purposes.

Referring to FIG. 1, the present disclosure relates to a metal air battery 100 that has a plurality of anode-cathode disc assemblies 102 installed into a housing 104. In one embodiment, housing 104 is a cylindrical housing. Each housing 104 can be loaded into a galvanic engine 300 (see FIG. 3) for the purposes of quick load and unload of new and spent housings 104. Each housing 104 (also referred to as a power unit) is designed for easy storage, unloading and reloading of the anode-cathode disc assemblies 102. Each housing 104 includes at least one access port 112 that provides liquids and/or gases to the anode-cathode disc assemblies 102. The access port 112 may also provide an electrical connection to the anode-cathode disc assemblies 102.

Figure 2:
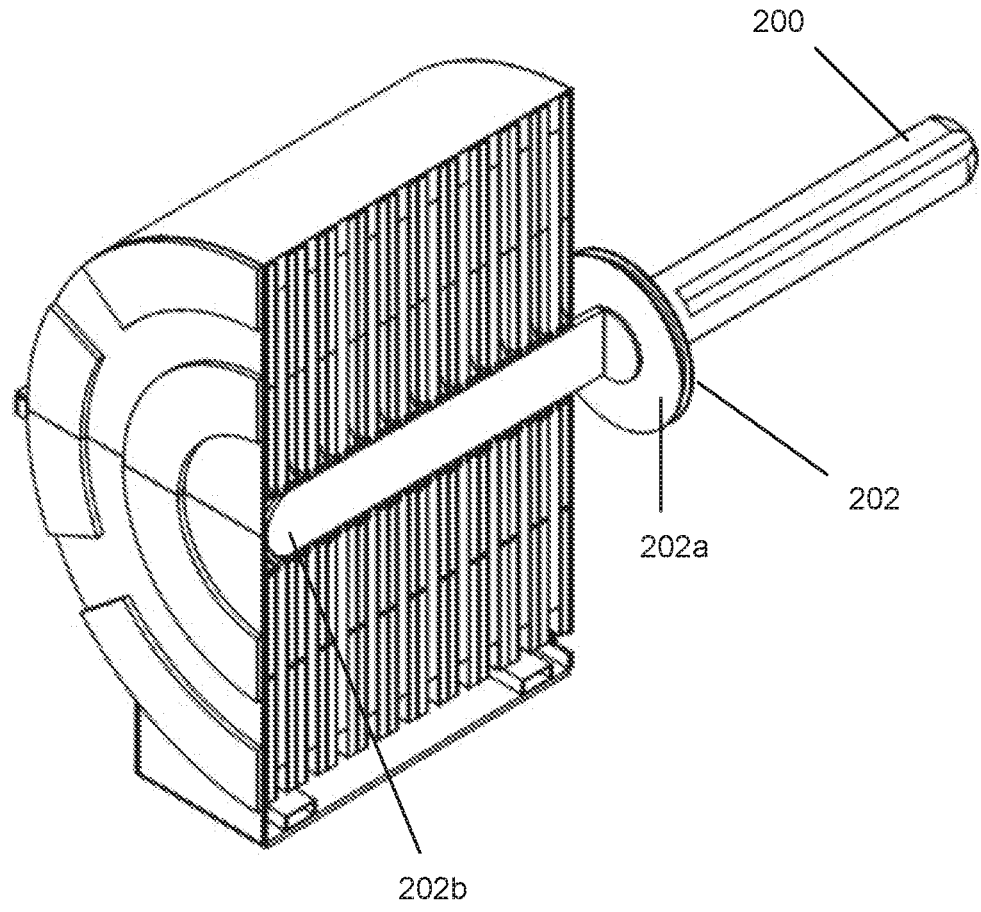
FIG. 2 is a cross section view of the metal air battery.

On the bottom of the housing 104 is at least one forklift guide 106 that allows the housing 104 to be moved to and from loading areas with ease. The upper half shell 108 on each housing 104 can be removed for quick access to the anode-cathode disc assemblies 102 inside. Each disc in the plurality of anode-cathode disc assemblies 102 has a central hole 110 which receives a power shaft 200 (see FIG. 2). As discussed in detail elsewhere in this specification, the power shaft 200 engages a rotating anode disc to cause its rotation while not engaging corresponding cathode discs and, thus, not rotating the cathode discs. The power shaft 200 has a curved terminus 202b that promotes insertion into the central hole 110 and subsequent alignment of each disc. In one embodiment, the power shaft 200 is a keyed power shaft that comprises at least one flat edge that engages a corresponding flat edge on a rotating anode disc. The power shaft 200 may be, for example, a cruciform keyed power shaft that has a cruciform cross section. The power shaft 200 is electrically conductive and may be formed of a suitable conductive metal, such as brass, nickel plated copper, or other corrosion resistant metals. The housing 104 also includes an opening 114 that aligns with the central hole 110 for receiving the power shaft 200.

Figure 3:
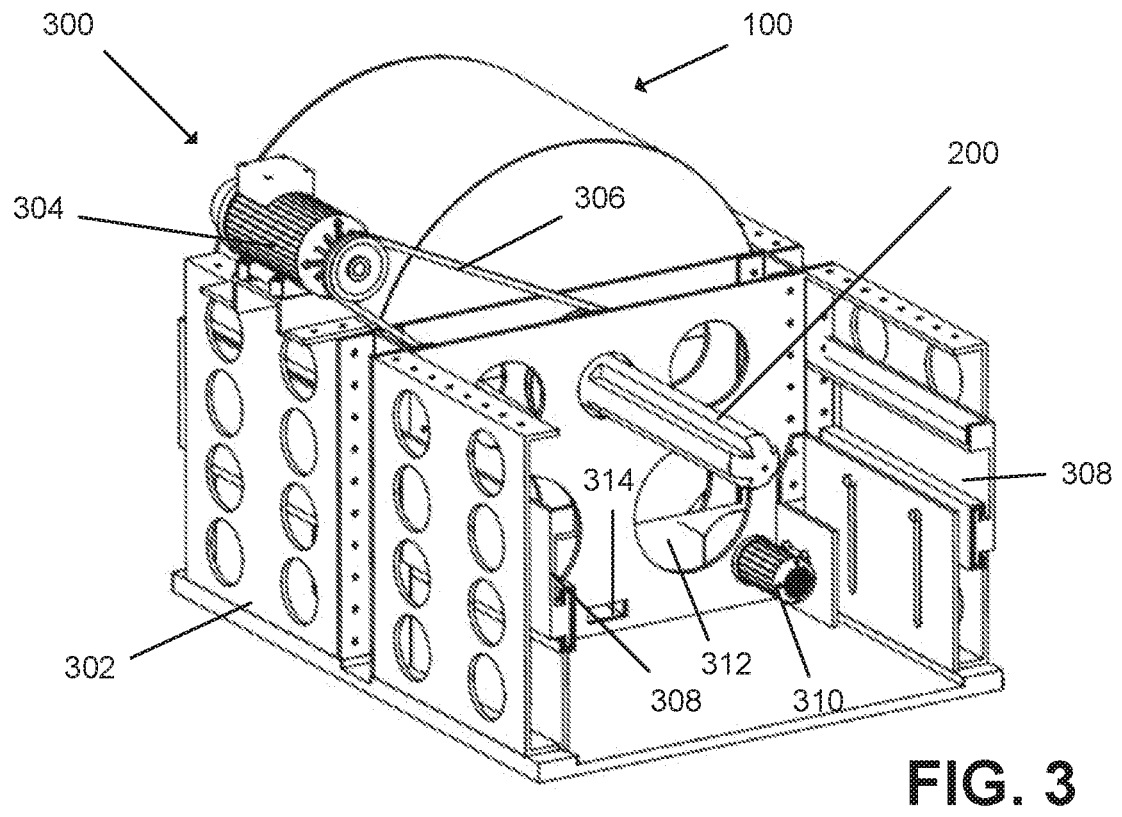
FIG. 3 is a perspective view of the metal air battery in a strongback support frame.
Figure 4A:
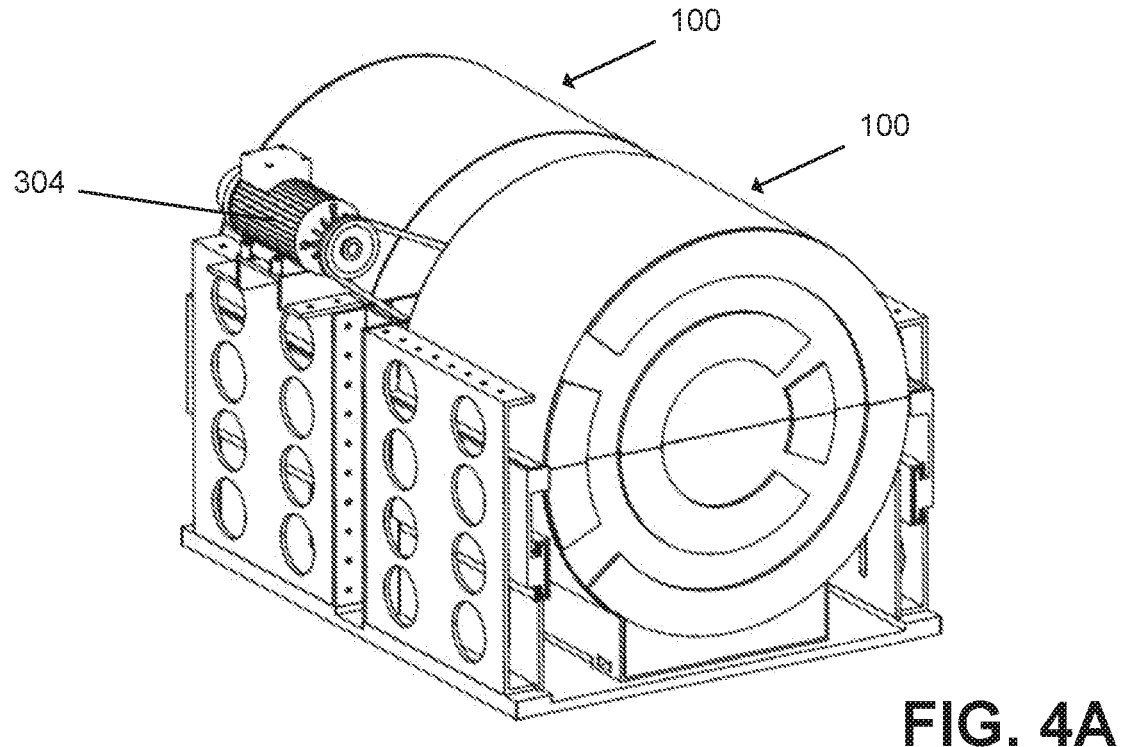
FIG. 4A is a perspective view of two metal air batteries in a strongback support frame.

FIG. 3 depicts a galvanic engine 300 which comprises a strongback support frame 302 which houses at least one metal air battery 100. The metal air battery 100 is removably attached to the strongback support frame 302. The power shaft 200 is rotatably mounted to the strongback support from 302. A drive motor 304 drives a transmission belt 306 which engages a pully 202 (see FIG. 2) on the power shaft 200. This rotates the power shaft 200 which, in turn, rotates the rotating anode disc 700 (see FIG. 7) at the same rotational speed as the power shaft 200. In the embodiment depicted in FIG. 2, the power shaft 200 comprises two elongated rods that longitudinally extend from the pully 202 symmetrically, thus permitting two metal air batteries 100 to be driven by the drive motor 304 (see FIG. 4A). The power shaft 200 of FIG. 2 therefore comprises a proximate end and a distal end with the pully 202 disposed therebetween. In the embodiment of FIG. 3, the drive motor 304 is mounted on the strongback support frame 302.

At the bottom of the strongback support frame 302 is a collector tank 312 that receives spent electrolyte from each metal air battery 100. Spent electrolyte exits the collector tank 312 via hole 314 where pump 310 pumps the electrolyte into an electrolyte tank(s) (not shown) for subsequent reuse. Also mounted to the strongback support frame 302 are mechanical arms 308 that articulate to load and unload metal air battery 100. The strongback support frame 302 may be mounted to a solid base 500 (see FIG. 5A) but can be reinforced to transmit mechanical loads across the galvanic engine 300 to front and back structures such as in a rail locomotive. The pully 202 has a flat disc surface 202a (see FIG. 2). Electrical brushes (not shown) or other slip ring technology including liquid metals facilitate transfer of electricity to a main bus.

Figure 4B:
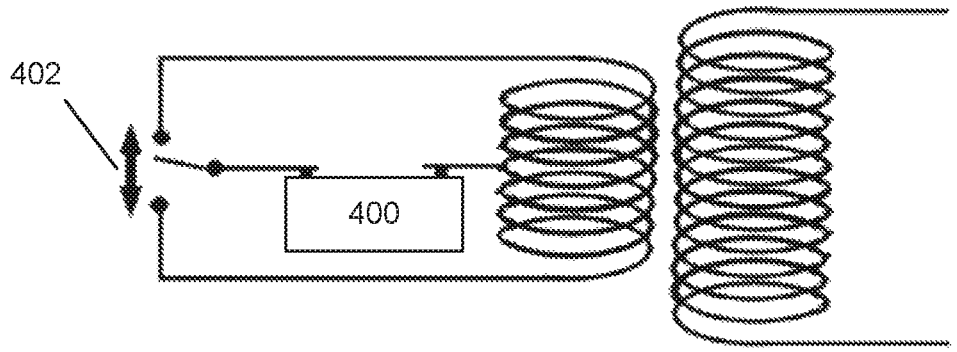
FIG. 4B depicts one method of producing AC current.

In one embodiment, the pully 202 has partitions to provide power to alternating brushes for the purpose of generating an AC current in a transformer winding. Referring to FIG. 4B, high-amperage/low-voltage AC current from a battery 400 is routed to a center tap on a transformer coil and then stepped up to a higher-voltage/lower-amperage output. A mechanism 402 continually changes current direction during this operation. In one embodiment, this is done at the pully 202. In another embodiment, an additional mechanical rotating brush set connected to one or multiple metal air batteries 100 is used.

As shown in FIGS. 5A to 5C, a fresh metal air battery 100 may be added to the strongback support frame 302. In FIG. 5A, a fresh metal air battery 100 is placed proximate the power shaft 200 such that the mechanical arms 308 secure the metal air battery 100. In FIG. 5B, the mechanical arms 308 raise the metal air battery 100 to align with the power shaft 200 such that the central hole 110 of the anode-cathode disc assemblies 102 aligns with the power shaft 200. The alignment may be facilitated by, for example, mechanical arms 308 (see FIG. 3), robotic arms, a forklift or other similar equipment. In FIG. 5C, the fresh metal air battery 100 is moved inwardly such that each of the anode-cathode disc assemblies 102 are engaged by the power shaft 200. In the embodiment of FIGS. 5A to 5C two metal air batteries 100 are shown. In another embodiment, a single metal air battery 100 is used for each strongback support frame 302. Once the metal air battery 100 is engaged with the strongback support frame 302, power, liquid and air connections are made using access port 112 (see FIG. 1). Quick coupling connections are used to connect access port 112 to the strongback support frame 302.

Figures 6A, 6B, 6C, 6D, 6E:
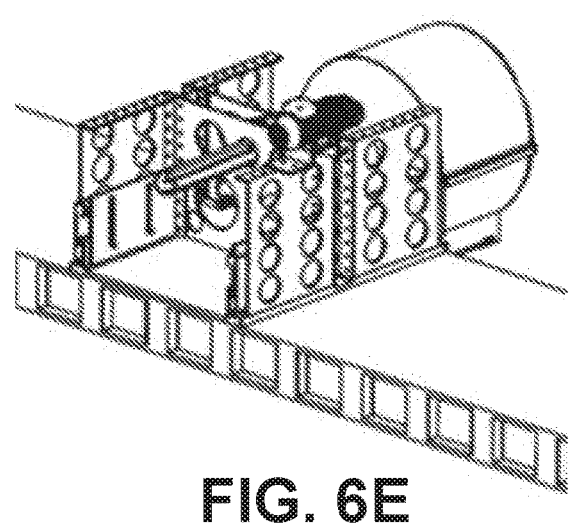
FIG. 6A, FIG. 6B, FIG. 6C, FIG. 6D and FIG. 6E depict the removal of a spent metal air battery from the strongback support frame.

Referring to FIGS. 6A to 6E, a spent metal air battery 100 may be removed from the strongback support frame 302. In FIG. 6A, a spent metal air battery 100 is fully engaged with the strongback support frame 302. In FIG. 6B, the metal air battery 100 is moved outwardly using mechanical arms 308 such that each of the anode-cathode disc assemblies 102 becomes disengaged with the power shaft 200. In FIG. 6C, the mechanical arms 308 lower such that metal air battery 100 is no longer aligned with the power shaft 200. For example, the metal air battery 100 may be lowered to allow access by a forklift. Additionally or alternatively, the repositioning may be facilitated by, for example, robotic arms, a forklift or other similar equipment. In FIG. 6D, the mechanical arms 308 have been raised and retracted to return them to their original position within the strongback support frame 302. In FIG. 6E one metal air battery 100 has been removed such that a fresh metal air battery 100 can now be added in its place (see FIGS. 5A to 5C). The metal air battery 100 is reusable with only the anode being consumed during operation.

Figures 7, 8:
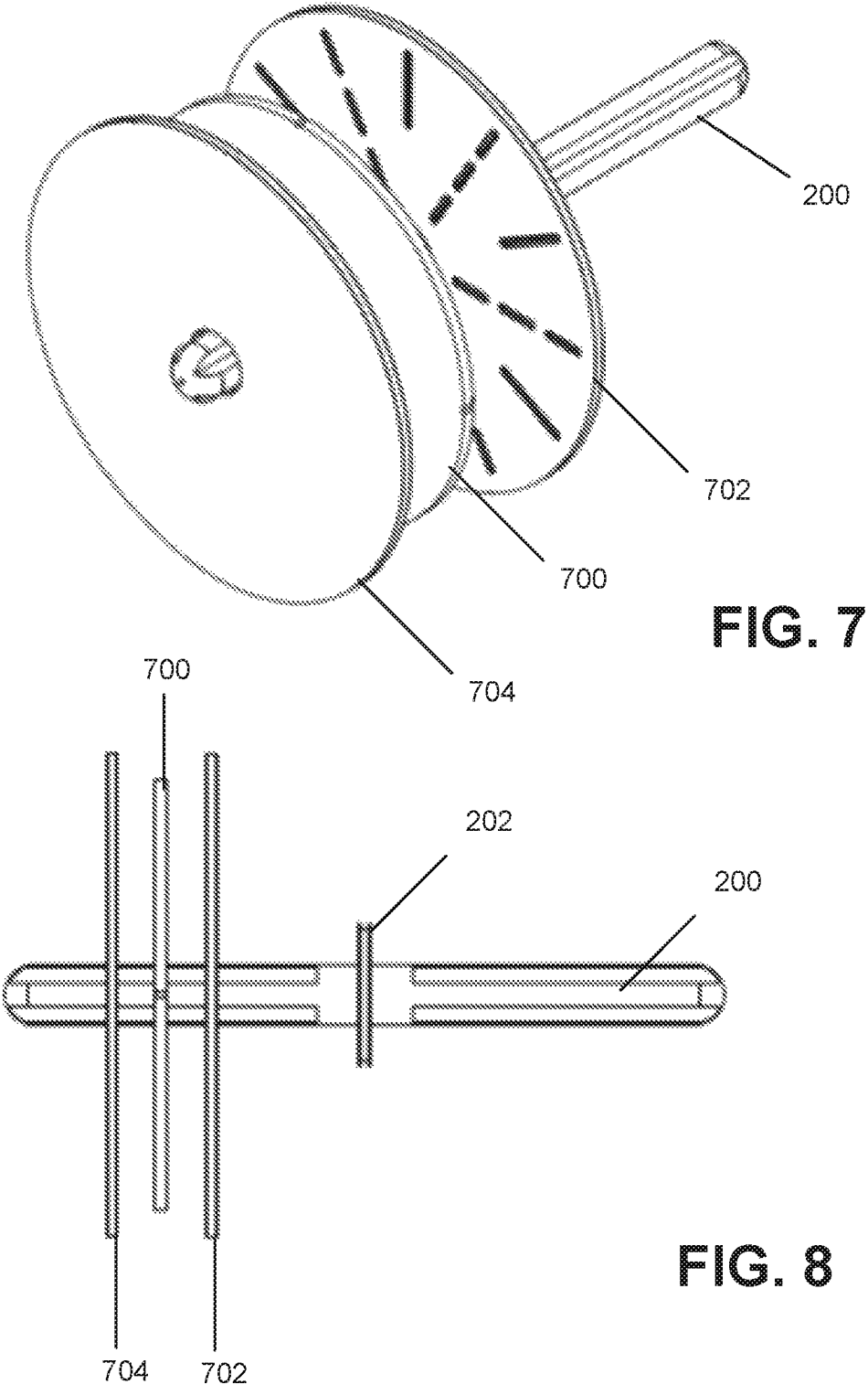
FIG. 7 is a perspective view of an anode-cathode disc assembly on a power shaft.
FIG. 8 is a plan view of the anode-cathode disc assembly on a power shaft.

FIG. 7 and FIG. 8 depict a single anode-cathode disc assembly 102 which comprises a rotating anode disc 700 (e.g. an aluminum anode) and a pair of cathode discs 702, 704.

FIG. 9A and FIG. 9B depict the rotating anode disc 700. Each rotating anode disc 700 has a keyed hole 900 (e.g. a cruciform keyed hole) that is indexed to mate with the power shaft 200 such that rotation of the power shaft 200 rotates the rotating anode disc 700. The keyed hole 900 is non-circular.

Around the outside circumference of the rotating anode disc 700 are notches 902 (e.g. four semicircular notches) that are registered to a corresponding point in the keyed hole 900 at the center. The notches 902 allow for registration of multiple rotating anode discs 700 in a single housing 104 so that the power shaft 220 can slip into and load multiple rotating anode discs 700 at a time. The multiple rotating anode discs 700 can move freely in a lateral direction 1000 (see FIG. 10) parallel to the power shaft 200.

Each rotating anode disc 700 has a central electrically conducting disc 904 (e.g. a brass conductor disc) that has been embedded into the central, circular hole of the rotating anode disc 700. The central electrically conducting disc 904 provides the keyed hole 900. During manufacture the central electrically conducting disc 904 is shrunk by thermal contraction (e.g. cooling in liquid nitrogen). The central hole of the rotating anode disc 700 is enlarged by thermal expansion (e.g. heating to a suitable temperature). The shrunk central electrically conducting disc 904 is then placed in the enlarged central hole of the rotating anode disc 700. Both the cooled central electrically conducting disc 904 and the heated rotating anode disc 700 are allowed to return to room temperature. The increase in size of the central electrically conducting disc 904 as it warms, along with the decrease size of the hole in the rotating anode disc 700 as it cools, provides for a high conducting bond between the rotating anode disc 700 and central electrically conducting disc 904 for the purpose of low electrical resistance. Due to the high output of the metal air battery 100, a high conducting bond is highly desirable.

Figure 11:
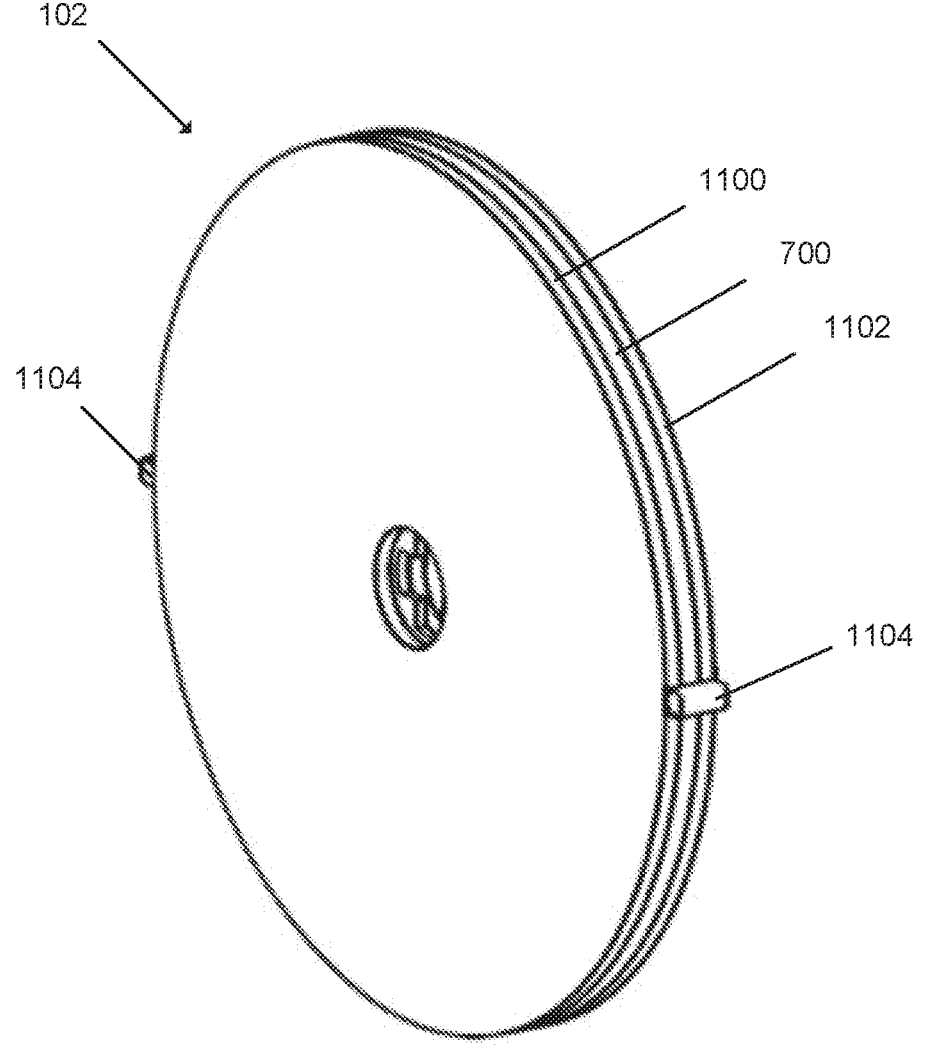
FIG. 11 is a perspective view of the anode-cathode disc assembly showing actuators.

Referring to FIG. 11, the pair of cathode discs 702, 704 consists of a first cathode disc 1100 and a second cathode disc 1102. An actuator 1104 is connected to both the first cathode disc 1100 and the second cathode disc 1002 such that actuation of the actuator 1104 causes the second cathode disc 1102 to longitudinally move along the power shaft 200 relative to the first cathode disc 1100. In this manner, the gap between the first cathode disc 1100 and the second cathode disc 1102 is controlled through actuation of the actuator. The rotating anode disc 700 is disposed between the first cathode disc 1100 and the second cathode disc 1102. As the rotating anode disc 700 becomes thinner due to consumption, the gap can be adjusted accordingly. The gap can also be reduced to zero so the rotating anode disc 700 is secured during loading and unloading of the metal air battery 100. The gap can also be expanded to facilitate replacement of spent rotating anode disc 700 with a fresh disc. In the embodiment of FIG. 11, there are two actuators 1104 on opposite sides of each pair of cathode discs 702, 704. The central hole in each cathode disc is circular and is not keyed to the power shaft 200.

In one embodiment, the first cathode disc 1100 is a stationary cathode disc which is fixedly connected to the housing 104 such that there is no longitudinal movement. In such an embodiment, the second cathode disc 1102 is a moving cathode disc that is moveably connected to the first cathode disc 1100 such that longitudinal movement is permitted. In such an embodiment, the actuator 1104 may be fixedly connected to both the housing and the first cathode disc 1100.

The actuators 1104 are connected to the access port 112 (see FIG. 1) of the housing 104 and thereby receive liquids (e.g. electrolyte), gases (e.g. air and/or oxygen) and transmit electrical power within the air metal battery 100. The actuators 1104 provide pathways that pass the liquid, gases and electricity from the first cathode disc 1100 to the second cathode disc 1102.

Figures 12A, 12B, 12C:
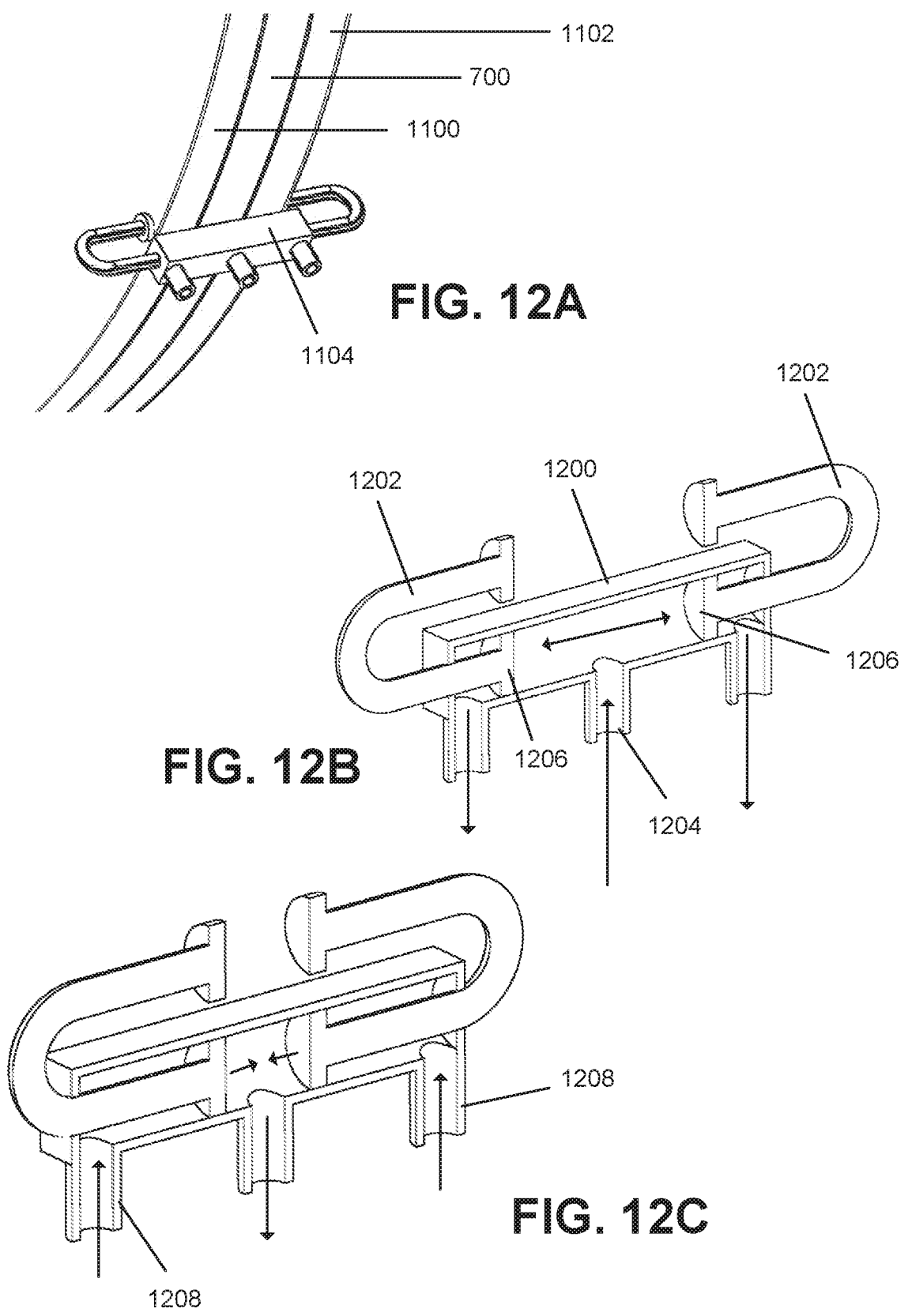
FIG. 12A, FIG. 12B and FIG. 12C depict one embodiment of the actuator.
Figure 12A:
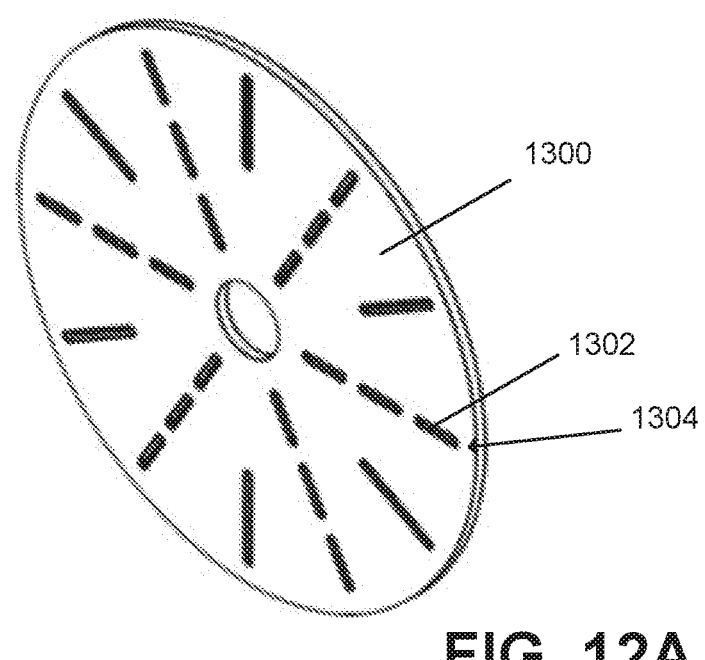
Figure 12B:
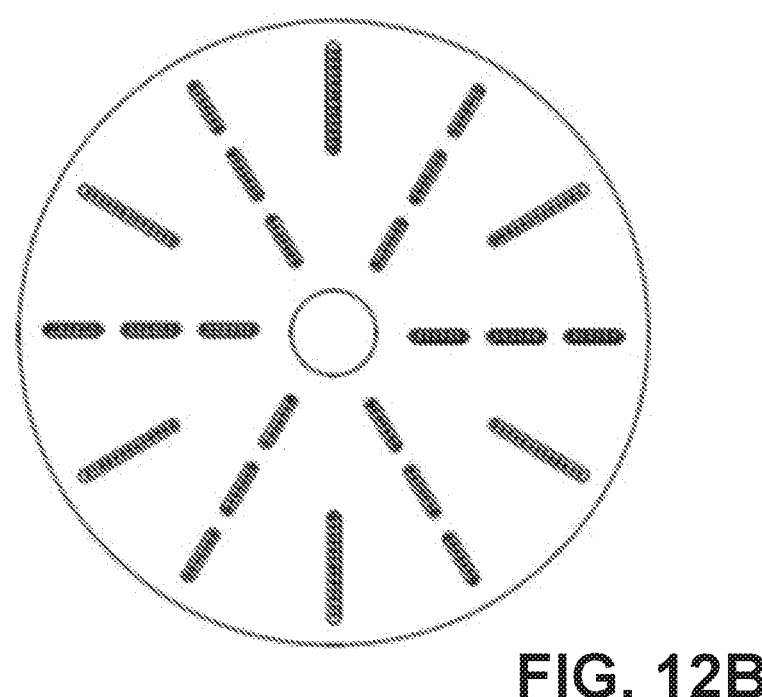

FIGS. 12A to 12C depict one embodiment of the actuator 1104. The actuator 1104 comprises a hollow cylinder 1200 with two hydraulic arms 1202 that are U-shaped. Introduction of hydraulic fluid to port 1204 moves the hydraulic arms 1202 in an outward direction by engaging plungers 1206. This moves the cathode discs apart. In contrast, introduction of hydraulic fluid to ports 1206 engages plungers 1206 in the opposite direction. This moves the cathode discs closer together.

Referring to FIG. 13A and FIG. 13B, a cathode surface 1300 is shown. Cathode surface 1300 is used in both the first cathode disc 1100 and the second cathode disc 1102 and faces the rotating anode disc 700. The cathode surface 1300 has nozzles 1302 that inject electrolyte between the respective cathode disc and the rotating anode disc 700. The nozzles 1302 are disposed in shallow depressions 1304 (e.g. channels) on the cathode surface 1300. The nozzles 1302 are fluidly connected to the access port 112. The depressions can be of many shapes to facilitate even distribution of the electrolyte. Each anode-cathode disc assembly 102 can have the electrolyte independently turned on or off to facilitate different power demands.

During operation, the electrolyte is discharged by centrifugal action off the rotating anode disc 700 and subsequently falls to the collector tank 312.

To halt operation of a particular anode-cathode disc assembly 102 air, rather than electrolyte, is injected through the nozzles 1302. During normal operation, the rotating anode disc 700 rotates at a relatively slow speed (e.g. 10 to 30 rpm) to provide even corrosion of the rotating anode disc 700 and generating a hydrodynamic action that spreads the electrolyte between the gap to submerge the entire rotating anode disc 700 and the pair of cathode discs 702, 704. This liquid thrust bearing provides a constant distance (e.g. about 4 mm) between adjacent discs and therefore constant electrical resistance.

At this low speed, along with the air jet nozzles, a rotating anode disc 700 can dry in about 15 seconds rendering it inert until needed again. During main engine shutdown all rotating anode discs 700 are rotated at several hundred rpm (e.g. 200-500 rpm) while applying air through the nozzles 1302. This results in total drying for long term storage.

The galvanic engines 300 can be arranged in series and/or in parallel to provide a desired power for a particular application. In the case of ship engines multiple levels or stories of galvanic engines 300 can provide over 20,000 HP to run a ship or small city. Increased cylinders can be added to increase power as needed.

Figure 14:
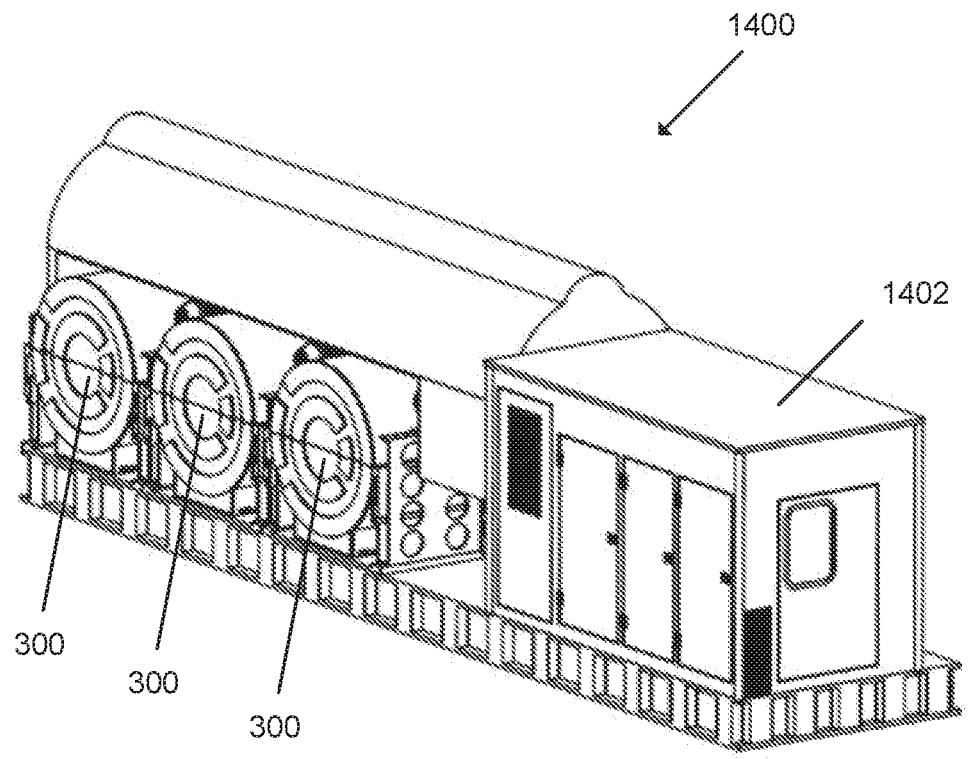
FIG. 14 depicts a stationary power station.

FIG. 14 depicts a power station 1400 with six galvanic engines 300, three of which are visible. A utility room 1402 is adjacent the galvanic engines.

Figure 15:
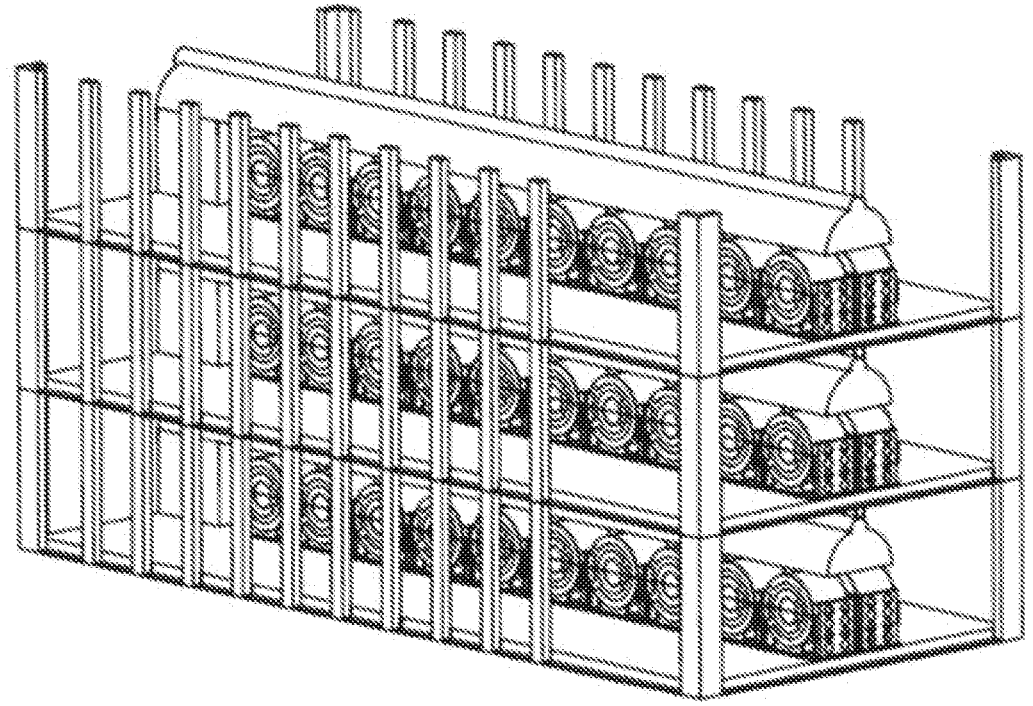
FIG. 15 depicts multiple arrays of galvanic engines in a power plant.

FIG. 15 depicts three arrays of galvanic engines that are stacked on multiple floors of a power plant. Each of these galvanic engines may be arranged in series and/or in parallel.

Figures 16A, 16B:
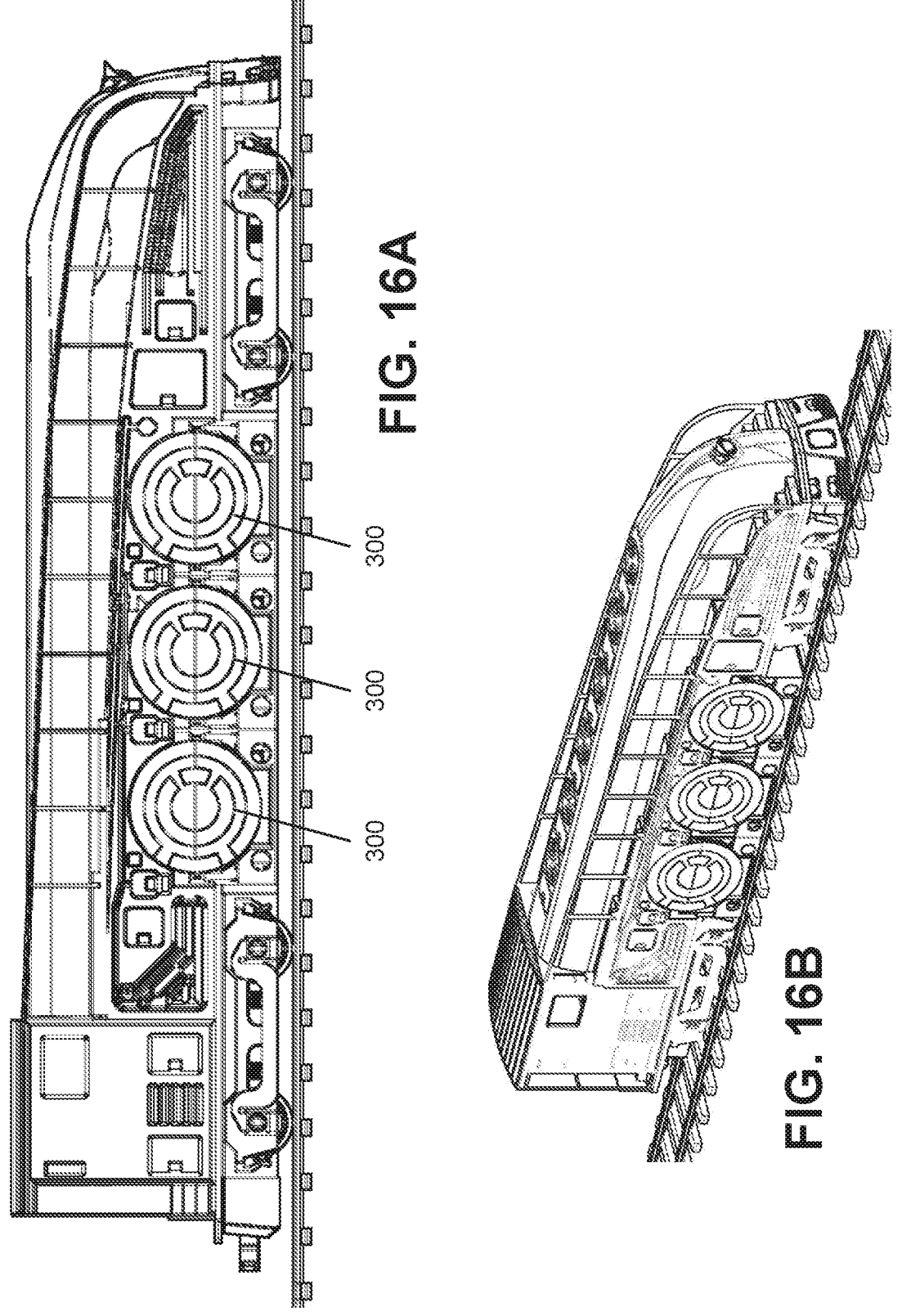
FIG. 16A and FIG. 16B depict multiple galvanic engines used in a train.

FIG. 16A and FIG. 16B depict a train that has six galvanic engines 300, three of which are visible.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A metal air battery comprising:
   a housing comprising an opening with a keyed power shaft disposed in the opening;
   a plurality of anode-cathode disc assemblies disposed within the housing each anode-cathode disc assembly comprising;
      a first cathode disc, wherein the keyed power shaft is disposed within a first circular hole of the first cathode disc;
      a second cathode disc, wherein the keyed power shaft is disposed within a second circular hole of the second cathode disc;
      an actuator directly connected to both the first cathode disc and the second cathode disc, the actuator configured to change a magnitude of a gap between the first cathode disc and the second cathode disc;
      a rotating anode disc disposed between the first cathode disc and the second cathode disc, wherein the keyed power shaft is disposed within a keyed hole of the rotating anode disc such that rotation of the keyed power shaft rotates the rotating anode disc, the keyed hole being non-circular;
   the housing further comprising at least one access port configured to provide a liquid, a gas or an electrical connection to the plurality of anode-cathode disc assemblies.

2. The metal air battery as recited in claim 1, wherein the first cathode disc and the second cathode disc each comprise a respective cathode surface that faces the rotating anode disc, each of the cathode surfaces comprising nozzles that fluidly connect to the at least one access port such that, when liquid electrolyte is injected through the nozzles between each respective cathode surface and the rotating anode disc a liquid thrust bearing is formed.

3. The metal air battery as recited in claim 1, wherein the keyed power shaft is a cruciform keyed power shaft.

4. The metal air battery as recited in claim 3, wherein the keyed hole is a cruciform keyed hole.

5. The metal air battery as recited in claim 1, wherein the rotating anode disc has outside circumference with at least one notch.

6. The metal air battery as recited in claim 1, wherein the rotating anode disc comprises a central, circular hole and an electrically conducting disc is disposed within the central, circular hole, the keyed hole being disposed in the electrically conducting disc, wherein the rotating anode disc and the electrically conducting disc are two different metals.

7. The metal air battery as recited in claim 6, wherein the rotating anode disc is aluminum, and the electrically conducting disc is brass.

8. The metal air battery as recited in claim 1, wherein the keyed power shaft further comprises a pully with a flat disc surface.

9. A metal air battery system comprising a strongback support frame and the metal air battery as recited in claim 1, wherein the metal air battery is removably attached to the strongback support frame.

10. The metal air battery system as recited in claim 9, wherein the metal air battery is removably attached to the strongback support frame with a mechanical arm.

11. A metal air galvanic engine comprising;
a first metal air battery and a second metal air battery, each as recited in claim 1;
wherein the keyed power shaft comprises a proximate end and a distal end of the keyed power shaft, the proximate end being disposed in the first metal air battery and the distal end being disposed in the second metal air battery.

12. The metal air galvanic engine as recited in claim 11, further comprising a strongback support frame, the first metal air battery and the second metal air battery are each removably attached to the strongback support frame.

13. The metal air galvanic engine as recited in claim 12, the first metal air battery and the second metal air battery are each removably attached to the strongback support frame with a first mechanical arm and second mechanical arm, respectively.

14. The metal air galvanic engine as recited in claim 11, further comprising a drive motor that rotates the keyed power shaft.

15. The metal air galvanic engine as recited in claim 14, wherein the drive motor is mounted to the strongback support frame.

16. An array of metal air galvanic engines, the array comprising a plurality of metal air galvanic engines as recited in claim 11.

17. A metal air battery comprising:
a housing comprising an opening with a keyed power shaft disposed in the opening;
a plurality of anode-cathode disc assemblies disposed within the housing each anode-cathode disc assembly comprising;
a first cathode disc, wherein the keyed power shaft is disposed within a first circular hole of the first cathode disc, wherein the first cathode disc is fixedly connected relative to the housing;
a second cathode disc, wherein the keyed power shaft is disposed within a second circular hole of the second cathode disc;
an actuator directly connected to both the first cathode disc and the second cathode disc, the actuator configured to change a magnitude of a gap between the first cathode disc and the second cathode disc;
a rotating anode disc disposed between the first cathode disc and the second cathode disc, wherein the keyed power shaft is disposed within a keyed hole of the rotating anode disc such that rotation of the keyed power shaft rotates the rotating anode disc, the keyed hole being non-circular;

the housing further comprising at least one access port configured to provide a liquid, a gas or an electrical connection to the plurality of anode-cathode disc assemblies.

18. The metal air battery as recited in claim 17, wherein the first cathode disc and the second cathode disc each comprise a respective cathode surface that faces the rotating anode disc, each of the cathode surfaces comprising nozzles that fluidly connect to the at least one access port such that, when liquid electrolyte is injected through the nozzles between each respective cathode surface and the rotating anode disc a liquid thrust bearing is formed.

19. A metal air battery comprising:
a housing comprising an opening with a power shaft disposed in the opening;
a plurality of anode-cathode disc assemblies disposed within the housing each anode-cathode disc assembly comprising;
a first cathode disc, wherein the power shaft is disposed within a first circular hole of the first cathode disc;
a second cathode disc, wherein the power shaft is disposed within a second circular hole of the second cathode disc;
an actuator directly connected to both the first cathode disc and the second cathode disc, the actuator configured to change a magnitude of a gap between the first cathode disc and the second cathode disc;
a rotating anode disc disposed between the first cathode disc and the second cathode disc, wherein the power shaft is disposed within a hole of the rotating anode disc and engages the rotating anode disc such that rotation of the power shaft rotates the rotating anode disc while not rotating the first cathode disc or the second cathode disc;
the housing further comprising at least one access port configured to provide a liquid, a gas or an electrical connection to the plurality of anode-cathode disc assemblies.

20. The metal air battery as recited in claim 19, wherein the first cathode disc and the second cathode disc each comprise a respective cathode surface that faces the rotating anode disc, each of the cathode surfaces comprising nozzles that fluidly connect to the at least one access port such that, when liquid electrolyte is injected through the nozzles between each respective cathode surface and the rotating anode disc a liquid thrust bearing is formed.

* * * * *